United States Patent [19]

Schmiga et al.

[11] Patent Number: 4,834,948
[45] Date of Patent: May 30, 1989

[54] DEVICE FOR ENRICHING A FLUID WITH OZONE

[75] Inventors: Hubert Schmiga, Korntal; Klaus Wagner, Aichtal, both of Fed. Rep. of Germany

[73] Assignee: E. M. Heinkel K.G., Fed. Rep. of Germany

[21] Appl. No.: 53,094

[22] Filed: May 21, 1987

[30] Foreign Application Priority Data

Jul. 10, 1986 [DE] Fed. Rep. of Germany ....... 3623225

[51] Int. Cl.$^4$ .............................................. C01B 13/11
[52] U.S. Cl. ........................... 422/186.19; 422/186.18; 422/186.2
[58] Field of Search ...................... 422/186.07, 186.18, 422/186.19, 186.2, 907; 204/176

[56] References Cited

U.S. PATENT DOCUMENTS

| | | | |
|---|---|---|---|
| 653,078 | 7/1900 | Elworthy | 422/186.18 |
| 1,157,859 | 10/1915 | Freet | 422/186.18 |
| 3,671,417 | 6/1972 | Louboutin | 422/186.18 |
| 3,942,020 | 3/1976 | Clambrone | 422/186.18 |
| 4,011,165 | 3/1977 | Filippov et al. | 422/186.19 |
| 4,159,971 | 7/1979 | Gneupel | 422/186.19 |
| 4,234,800 | 11/1980 | Kenly, V et al. | 422/186.19 |
| 4,504,446 | 3/1985 | Kunicki et al. | 422/186.19 |
| 4,614,573 | 9/1986 | Masuda | 422/186.19 |
| 4,696,800 | 9/1987 | Sasaki et al. | 422/186.18 |

FOREIGN PATENT DOCUMENTS

| | | | |
|---|---|---|---|
| 409461 | 4/1910 | France | 422/186.18 |
| 8033316 | 7/1975 | Japan | 422/186.18 |

*Primary Examiner*—John F. Terapane
*Assistant Examiner*—Susan Wolffe
*Attorney, Agent, or Firm*—McGlew & Tuttle

[57] ABSTRACT

A device for enriching a fluid with ozone includes an inner tubular member arranged within an outer tubular member and defining a separate flow path for a fluid within the inner tubular member and another one for a fluid between the inner and outer tubular members. An electrode which has a high voltage regulation and a coil portion which extends through the inner tubular member forms a grounding electrode. A fluid such as air which is to be enriched with ozone is passed either through the inner tubular member or the space between the two tubular members and a cooling fluid is passed in the other tubular member. The inner tubular member is made of an ultraviolet penetrable and heat resistant material such as quartz glass.

11 Claims, 3 Drawing Sheets

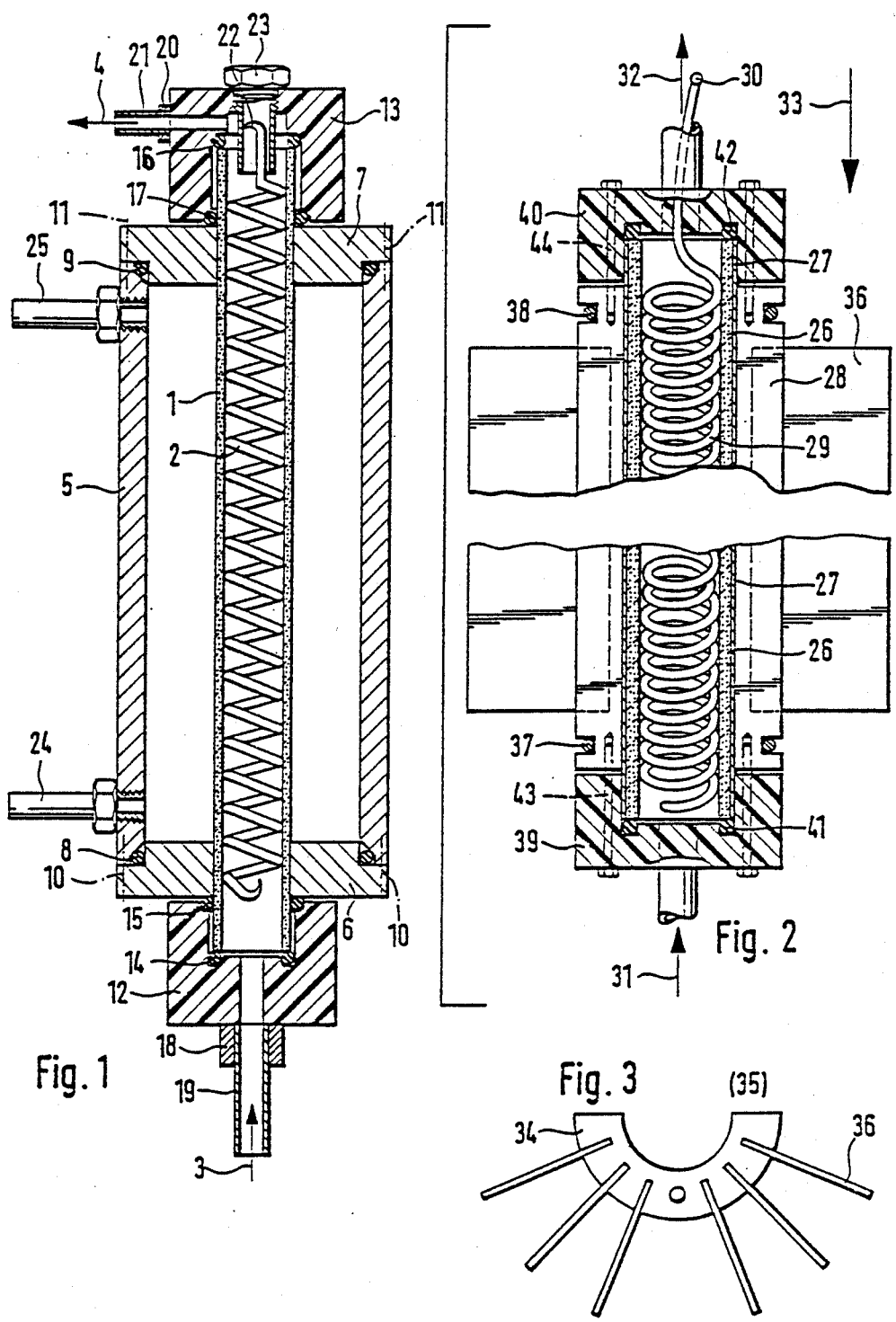

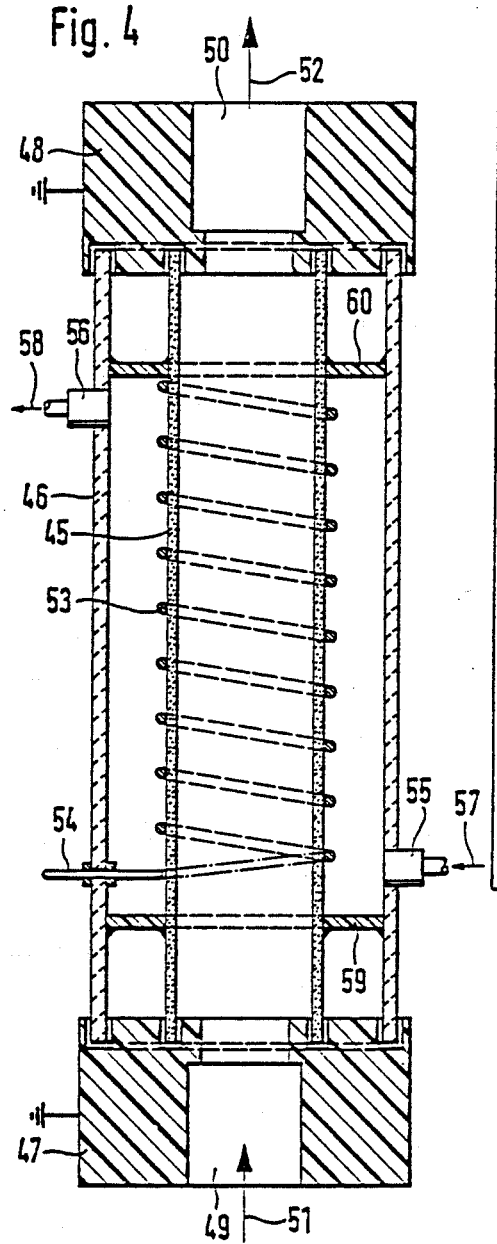
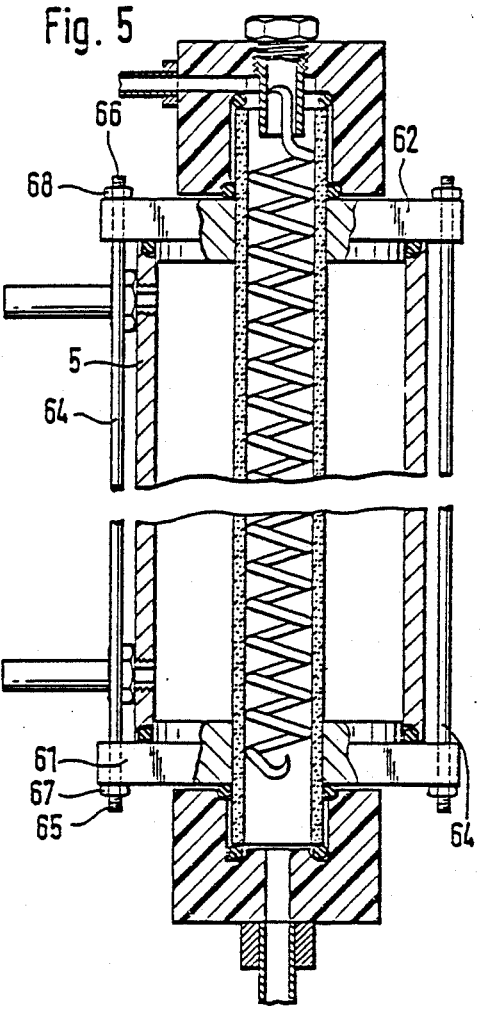
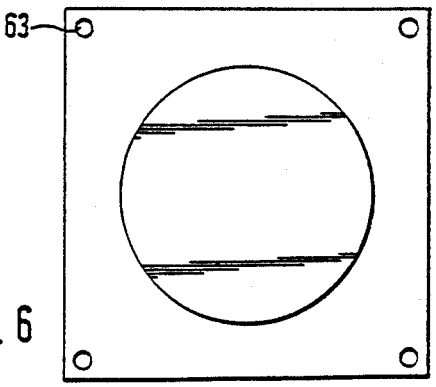

DEVICE FOR ENRICHING A FLUID WITH OZONE

FIELD AND BACKGROUND OF THE INVENTION

The invention relates in general to atmosphere treatment devices and in particular to a new and useful high-frequency ozonizer for ozonizing air or oxygen and for sterilizing water.

Ozonizers, especially the "Sienenssche ozonizer", have been known for a very long time. In this device, use is made of the discharge between two electrodes covered with a dielectric medium, the discharge being generated by an applied high-voltage alternating current. The electrodes in this may be plate-like or tubular.

In the course of years, a number of suggestions have been proposed both to make the energy consumption of the Sienenssche ozonizer more favorable and also to make the ozone production more efficient. Ozonizers which are driven by a high-voltage pulse generator and which comprises a gas discharge tube with two tubular, coaxially arranged electrodes, of which one is grounded and the other is connected with the high voltage, have proven to be advantageous (cf. e.g. U.S. Pat. No. 4,234,800).

It is now known that the ozone production increases with the applied frequency, however, it is also known that the heat loss likewise increases with the frequency. In the production of ozone by means of a corona discharge a considerable heating of the air or oxygen is takes place in the discharging space. However, with an increasing heating of the discharging space the ozone production decreases with an increasing supply of energy. It follows from this that the cost effectiveness in ozone production can be favorably influenced chiefly by reducing the heat problem. The common ozone generators driven with 50 Hz require a very high operating voltage (15–30 KV) and large vessels with a correspondingly expensive cooling system for a satisfactory ozone yield. However, this is no longer economically and technically justifiable in the case of smaller and average systems which are, for example, to be used with swimming pools or drinking water generators.

For this, high-frequency ozonizers have been developed which are usually driven by pulses. The discharge vessels can therefore be small, while the operating voltage is at 3-4 KV. However, the heating or cooling problem in all ozonizers remains to achieve a favorable energy balance (cf. e.g. EP-unexamined application No. 0088, 973; German Pat. No. 22 40 986; German Pat. No. 44 978). The energy problem and thus the avoidance of elevated heat with a sufficiently good ozone yield is however further aggravated when there is not much energy available, e.g. if the energy is obtained from solar batteries.

Accordingly, for the solution of the heat problem it has also been proposed to construct the inner electrode not tubularly, but as a solid metal cylinder and to join this cylinder in a form-fitting manner with the metallic end piece, which for its part is grounded. That is to say, the good heat-conducting grounding electrode pulls the forming heat outwards on the surface of the housing and thus aids the cooling effect of the air or oxygen flowing through. The aluminum layer deposited on the dielectric discharge tube and serving as the high-voltage electrode causes a diffusion of the surface area heat over the entire length of the discharge tube, when this layer is as long as the discharge tube. Moreover, the mirroring working inwards radiates the heat on the air flowing through. In this way, a very good evacuation of heat is therefore obtained without special cooling systems having to be used, and thus a good energy balance is achieved.

Another suggestion now is to use the water to be purified or sterilized itself instead of the inner electrode German Pat. No. 35 07 885.5). This means then that two concentric dielectric tubes (glass tubes) are necessary, between which the air to be ozonized can flow in and out without combining with the water. The discharge takes place between the metal layer applied to the outer glass tube and the water as a grounding electrode, since the distance between the two electrodes can be held sufficiently small. In this arrangement use is made of the fact that, with the corona discharge, UV-radiation in the range of 100–400 nm is generated. UV-radiation between 100 and 200 nm has an ozone-forming effect, so that the air in the double tube is still further ozonized. In addition, the water is sterilized by UV-radiation in the range 200–400 nm. The ozone produced is added to the thus already sterilized water for further refining. What is problematic with this arrangement is the external insulation of the high-voltage electrode. A further difficulty with all known ozonizers is that extremely dry air must be used, which necessitates an air-drying system that equals the true ozonizer in size and cost.

SUMMARY OF THE INVENTION

The present invention provides an ozonizer in which the problems and difficulties mentioned previously are not found and which also has a series of still further advantages.

In accordance with the invention a high frequency corona discharge device for enriching a fluid such as air with ozone, comprises an outer tubular member with an inner tubular member of ultraviolet penetrable heat-resisting material extending through the outer member and sealed in respect thereto. Means are provided such as inlets and outlets for passing a fluid to be enriched with ozone through one of the inner or outer tubular members and a cooling fluid is passed through the outer of the tubular members. In accordance with the invention, an electrode has a high voltage connection and includes a coiled portion extending through said inner tubular member and forming a grounding electrode.

The invention produces a series of significant advantges. Thus the structure of the ozonizer is very simple and easy to service, especially since no complicated sealing arrangements are necessary. It is also very advantageous that virtually no stresses are placed on the dryness of the air to be ozonized, so that in addition no expensive drying apparatus, such as in the ozonizers known till now, are necessary. Further, the external electrical insulation of the electrodes carrying the high voltage is very easily possible. An optimal ozone yield results from all these advantages.

Accordingly it is an object of the invention to provide a high-frequency corona discharging device for enriching fluid with ozone which comprises two tubular members arranged one within the other and containing an electrode in the form of a coil extending through the inner tubular member and which includes means for circulating a fluid through respective ones of said tubular members which may be either a cooling fluid or a fluid which is to be enriched such as air.

A further object of the invention is to provide a ozonizer which is simple in design, rugged in construction and economical to manufacture.

The various features of novelty which characterize the invention are pointed out with particularly in the claims annexed to and forming a part of this disclosure. For a better understanding of the invention, its operating advantags and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a sectional view of an ozonizer with water cooling constructed in accordance with the invention;

FIG. 2 is a view similar to FIG. 1 of another embodiment of the invention with air cooling;

FIG. 3 is an end elevation of a half-shell of the heat sink of the embodiment of FIG. 2;

FIGS. 4, 5, 6 and 7 are views similar to FIG. 1 of other embodiments of the invention.

DESCRIPTION OF THE PREFERRED EMBODIMENTS

Figure 7:
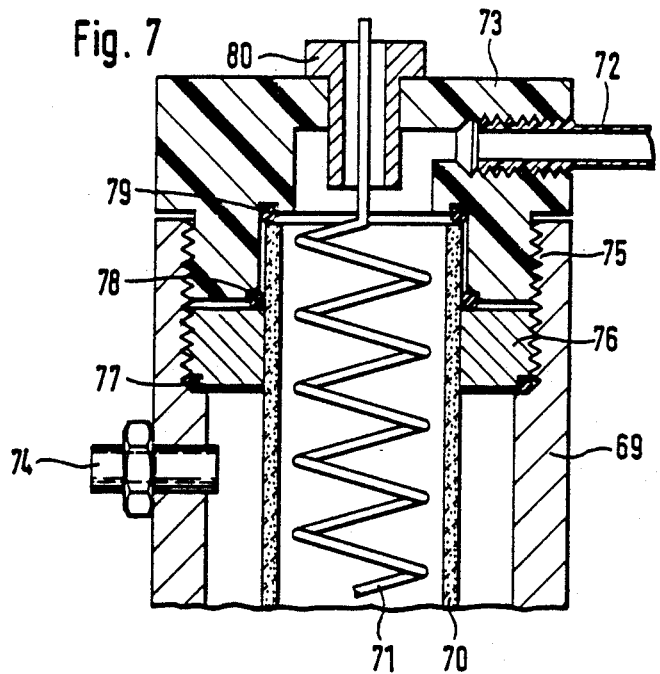

Referring to the drawings in particular the invention embodied therein comprises a high frequency corona discharge device which includes an outer tubular member 5 and an inner tubular member 1 extending through the outer tubular member and spaced from the interior thereof and sealed in respect thereto. Means including an inlet 19 and an outlet 21 are provided for passing a fluid through the inner tubular member or selectively through the outer tubular member in the space between the inner and outer tubular members which includes an inlet 24 and an outlet 25. In accordance with a feature of the invention, an electrode 2 has a high voltage connection and a coil portion which extends through the inner tubular member 1 and forms therewith a grounding electrode. The tubular members 1 and 5 are advantageously arranged concentrically and coaxially.

In the following description of the working examples, all those details which are superfluous to an understanding of the invention are omitted; in particular the electrical switching parts are not represented, since well known means for this are available.

In an older German application (P 35 07 885), an ozonizer of a similar type is already described, in which water is used for cooling and the cooling water is used as an electrode, preferably as the grounding electrode.

In most situations of application it is, of course, practical to use water as the cooling fluid. FIG. 1 shows such an ozonizer with the characteristics of the invention. The close-fitting coil 2 of refined steel as the high-voltage electrode is arranged in the tube 1 of quartz glass having a wall thickness of about 2.5 mm. The air to be ozonized is passed through the tube 1 and an inlet and through outlet in the direction of arrows 3 and 4. The tube 1 is surrounded by the concentric, metallic tube 5, which is grounded. The outer metal tube 5 is sealed water-tight by the two lids 6 and 7 being screwed tight with the tube 5 by a suitable number of threads 10 and 11. The lids 6 and 7 contain circular openings for the glass tube 1. This makes a simple and clean seal for the tube 1 to the outside possible.

The electrically non-conductive caps 12 and 13, which are screwed together with the lids 6 and 7, are placed over the ends of the tube 1; the seal is facilitated by the O-rings 14 and 15 or 16 and 17. The cap 12 has an opening 18 for the inlet for the air to be ozonized, which is supplied through the duct 19 attached to the cap 12. The cap 13 has an opening 20 through which the ozonized air is supplied to the outlet duct 21 attached to the cap 13.

The self-locking coil 2 is placed in the glass tube 1 with its lower end open; the upper end 22 of the coil 2 is inserted in a hollow screw 23 which is connected with a high voltage current.

The cooling water gets into the tube 5 through the inlet duct 24 and flows off again through the outlet duct 25. The water also serves as the high-voltage electrode with grounding potential, since it has contact with the metal tube 5.

With the application of the high-frequency high voltage, UV-radiation is generated which extends to all sides and therefore also penetrates through the quartz glass into the cooling water. Due to this the air flowing through the tube 1, which does not need to be dried, is both ozonized and the cooling water is not only ozonized but also sterilized. It is therefore advantageous to draw the cooling water off from the water to be cleaned.

FIG. 2 shows another working example in which air is used as the cooling fluid instead of water. Since with this it is only necessary to illustrate the differences with respect to the first working example, only these are represented and explained in detail.

The ozonizer consists of the tube 26 penetratable by UV-radiation, quartz glass is here also especially suited as a material. A metallic layer 27 preferably an aluminum layer, is applied on the tube 26, and it is grounded. A heat sink 28, which comprises two identical half-shells to simplify assembly, as is illustrated by FIG. 3, is slid resting tightly over the metallic layer 27. A self-locking metallic coil 29 is placed in the tube 26 and it is preferably made of refined steel. It is connected on its upper end by the contact 30 with the high voltage of about 2000 V and a frequency of 10–20 KHz. This contact can be formed as in FIG. 1.

Air is introduced into the tube 26 from below, as indicated by arrow 31, the air leaving ozonized at the upper end, which arrow 32 illustrates.

The coil 29 serves additionally as a high voltage electrode and the aluminum layer 27, or the heat sink 28 serve as a grounding electrode. If the high voltage is now applied, UV-radiation of 100–350 nm is generated inside the tube 26; the radiation being blocked off externally by the aluminum layer 27.

The UV-radiation has, as is well known, the effect that in the range of 100–200 nm it ozonizes air. The air supplied from below in the preceding example leaves there ozonized on the top and can then be used for treating, e.g. water, which is illustrated more precisely below by means of FIG. 5.

With the discharge between the two electrodes heat is generated, as is well known, which represents a major problem in most known ozonizers. In the simple construction of the new ozonizer this problem is also solved easily and successfully by means of a heat sink.

The construction of the heat sink 28 is seen from FIG. 3, which shows a view in the direction of the arrow 33 in FIG. 2.

According to this the heat sink 28 comprises two identical half-shells 34 and 35 each with cooling fins 36. The two half-shells 34 and 34 are not screwed together, but rather are joined together above and below by resilient clamping rings, e.g. the O-rings 37 and 38 (FIG. 1), so that a good thermal contact is also produced between the aluminum layer 27 and the heat sink 34, 35.

The closing of the tube 26 is schematically represented with the two caps 39 and 40 where here also the seal can result by means of the O-rings 41 and 42. Finally, the caps 39 and 40 can be screwed to the heat sink by screws 43 and 44.

It lies within the scope of the principle of the invention, namely the use of UV-radiation, if the high-voltage coil is not arranged inside the inner tube, but is placed on the inner tube and the cooling water as the grounding electrode is passed through the inner tube and the air to be ozonized flows between the two tubes. This is illustrated more precisely by FIG. 4.

The ozonizer of FIG. 4 comprises two concentric, electrically non-conductive tubes 45 and 46; the inner tube 45 is of quartz glass while the outer tube 46 may be of normal glass. The tubes 45 and 46 are hermetically sealed against each other by being fixed tightly in the end pieces 47 and 48; the end pieces 47 and 48 are of metal, preferably refined steel, and are grounded. Both end pieces have additionally channels 49 and 50 through which water can flow into and out of the inner tube 45, as indicated by arrows 51 and 52.

At the two ends of the double tube, the washers 59 and 60 are disposed at a certain distance from the end pieces 47 and 48 respectively. These washers are connected in an airtight manner with the walls of the inner tubes 45 and 46. The washers 59 and 60 in addition avoid the penetration of humidity into the air space.

This embodiment functions as follows:

The air to be ionized is led over the inlet connecting piece 55 between the two tubes 45 and 46. If the high voltage is impressed over the connection 54 to the coil 53 and if the cooling water as a grounding electrode is led through the inner tube 45, a UV-radiation is generated, spreading to all sides and penetrating the cooling water as well as the air between the two rods to cause the desired described effect. The water is sterilized by the UV-radiation. Furthermore, the oxygen which may be present is ozonized. The air is ozonized by the radiation and leaves through the outlet connecting piece 56. The air may then be used to fulfill the function of purification of water of the swimming pool or the like.

FIG. 5 shows a modified example of FIG. 1, differing from FIG. 1 solely by the attachment of the two lids 6 and 7 at the outer tube. Therefore, only this difference is described. FIG. 6 shows the modified lids 61 and 62 which are square. The margins of these lids 61 and 62 protrude from the circumference of the tube. In the four corners of the lids 61 and 62 holes 63 are provided through which the rods are passed. The rods 64 show below and above screw threads 65 and 66, onto which the screw nut 67 or 68 can be screwed. By tightly driving home the screws and in the case of the seals represented in FIG. 1, a tight closing of the tube 5 is obtained.

This form of embodiment represents a simplification with reference to the two lids 6 and 7, since the construction of the internal screw thread in the tube 5 of FIG. 1 is very difficult and expensive.

Another development of the invention, which is applicable in all the working examples with the coil lying inside the inner tube, consists in providing a glass bar inside the coil whose outer diameter is somewhat smaller than the inner diameter of the coil. In doing so, a constriction of the flow section for the air is obtained and thus an increase of the flow rate. The increased rate in turn then causes a reduction of the ozone re-formation along the ozone tube.

The invention was illustrated by means of a few working examples. It is evident that still other embodiments are possible within the scope of the principle of the invention; in particular, additional variants are conceivable for the mutual closing of the two tubes. Therefore an additional advantageous example for this is described with the aid of FIG. 7. Since the development only relates to the closing of the two tubes, only as much of the ozonizer is shown as is necessary for the illustration. The ozonizer here also consists of the outer tube 69 of refined steel and the inner tube 70 of quartz glass. The air flows inside the tube 70, in which is found the coil 71 as the high-voltage electrode. The treated air flows through the plastic duct 72, which is screwed into the plastic cap 73, for distribution. The metal duct 74 serves as the inlet of the heat sink.

The tube 69 has wall parts at opposite ends of reduced thickness where it and has a screw thread 75 on its inner wall surface. The cylindrical closing ring 76 of refined steel is screwed into this screw thread 75 and sealed against the tube 69 by means of a gasket 77. The inner wall of the form-fitting closing ring 76 surrounds the inner tube 70. The closing cap 73 is screwed into the tube 69 on top of the closing ring 76, that is, also through the screw thread 75. The cap 73 is sealed against the wet side of the tube 70 by the gasket 78 and against the air side of the tube 70 by the gasket 79. The cap 73 has an opening, as in FIG. 1, for screwing in the metal screw 80, which forms the electrical connection to the coil 71.

The formation of the closing on opposite ends of the two tubes 69 and 70 is analogous with regard to the difference between the two closings as shown by FIG. 1. The embodiment described here has advantages for production with a certain size of the ozonizer, since the screw thread 75 and the screw thread on the ring 77 or the cap 73 are easy to produce.

Figure 8:
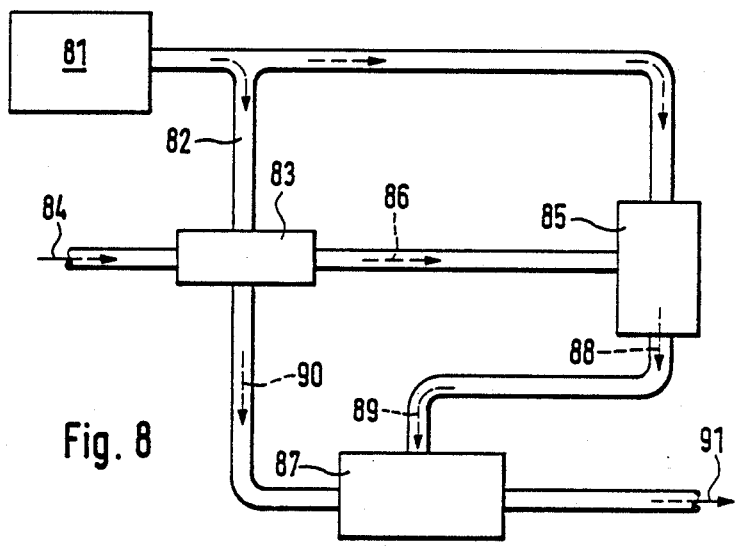
FIG. 8 is a schematical view of an entire ozonizing and sterilizing system utilizing the invention.

It now seems useful to sketch briefly, with the aid of FIG. 8, a water purification system in which the ozonizers of ionvention can be used according to the two preceding examples.

It is supposed that the water of a swimming pool is to be purified and sterilized. To this end the water is withdrawn from the swimming pool 81 and in part supplied as cooling water through the conduit 82 to the ozonizer 83. In the ozonizer 83, the air supplied from the left (arrow 84) is ozonized according to one of the processes described above and fed to the venturi pump 85 (arrow 86). In the venturi pump 85, the ozonized air is mixed with the water of the swimming pool 81 to be cleaned and the mixture is directed to the reactor 87 (arrows 88 and 89). In addition, the cooling water sterilized by the UV-radiation is fed to the reactor 87 (arrow 90). The water remains in the reactor 87 about two to three minutes, so that the ozone can react with the bacteria and other materials in the water in order to purify it. The purified air and disinfected water is then directed back into the swimming pool 81 (arrow 91). This cycle is repeated until the water has reached the desired degree of purity.

Instead of the venturi pump, a compressor can also be used to pump the water from the swimming pool into the reactor.

While specific embodiments of the invention have been shown and described in detail to illustrate the application of the principles of the invention, it will be understood that the invention may be embodied otherwise without departing from such principles.

What is claimed is:

1. A high frequency corona discharge device for enriching a fluid with ozone comprising: an outer tubular member; an inner tubular member positioned substantially concentrically within said outer tubular member and extending through said outer tubular member, said inner tubular member being formed of an ultraviolet penetrable and heat resistant material; an electrode having a high voltage connection portion and a coil portion positioned within said inner tubular member forming a grounding electrode with said inner tubular member; means for passing fluid to be enriched with ozone through said inner tubular member; and, means for passing cooling fluid through the space between the inner and outer tubular members, said outer tubular member being grounded such that the cooling fluid serves as a high-voltage electrode with grounding potential.

2. A high frequency device according to claim 1, wherein: said outer tubular member is sealed by first and second lid members, each of said lid members being composed of conductive material sealed with elastic UV-resistant O-rings, said first and second lids being provided with openings for communication with said inner tube.

3. A high frequency device according to claim 1, wherein: said inner tube is sealed by non-conductive caps and by elastic O-rings, said caps providing an opening for allowing treated fluid out of said inner tube as well as providing an opening for a metallic hollow screw, said metallic hollow screw being connected with said electrode and connected to a high voltage current source, said outer tubular member having an inlet and an outlet for supply and evacuation of cooling fluid.

4. A high frequency device according to claim 1, further comprising: first and second end covers forming end walls of said outer tubular member, said screw covers having corners provided with holes, tie rods being passed through corresponding holes of said covers, said tie rods having threaded portions engageable with a nut so as to urge the covers into tight engagement with said outer tubular members.

5. A high frequency device according to claim 1, wherein: said outer tubular member has first and second ends with wall parts of reduced thickness each having an inner threaded portion, a metal ring being positionable about said inner tubular member with an outer threaded portion engaging said tubular member threaded portion so as to seal off an inner space of said outer tubular member, a synthetic cover having an opening for connection with said inner tubular member fluid being positioned engaging said threaded portion of said outer tubular member.

6. A high frequency device according to claim 1, further comprising: first and second end covers forming end walls of said outer tubular member, said screw covers having corners provided with holes, tie rods being passed through corresponding holes of said covers, said tie rods having threaded portions engageable with a nut so as to urge the covers into tight engagement with said outer tubular member.

7. A high frequency device according to claim 1, wherein: said outer tubular member has first and second ends with wall parts of reduced thickness each having an inner threaded portion, a metal ring being positionable about said inner tubular member with an outer threaded portion engaging said tubular member threaded portion so as to seal off an inner space of said outer tubular member, a synthetic cover having an opening for connection with said inner tubular member, fluid being positioned engaging said threaded portion of said outer tubular member.

8. A high frequency ozonizer for ozonization of air or oxygen comprising: a first tubular member and a second tubular member, each of said first and second tubular members being open on each side, said second tubular member being positioned concentrically within said first tubular member, a spiral shaped high voltage electrode being tightly positioned in engagement on an exterior portion of said second tubular member, said second tubular member being formed of ultraviolet penetrable and heat-resistant material, cooling water being positioned within said inner tubular member acting as a counter electrode and as a coolant material, air to be ionized being positioned between said first and second tubular members so as to pass between said first and second tubular members near said electrode, two end pieces formed out of conductive material being connected to ground, each of said end pieces having channels to supply the coolant water to said inner tubular member and the air to be ionized to said outer tubular member and including outlets for the cooling water and the air to be ionized.

9. A high frequency ionizer according to claim 8, wherein: spacing discs are positioned at a lower and upper end of each of said first and second tubular members.

10. A high frequency corona discharge device for enriching a fluid with ozone comprising:
   a tube formed of quartz glass;
   a high frequency electrode having a high voltage connection portion and a coil portion positioned within the tube to extend therealong;
   an aluminium layer disposed on an outer side of said glass tube serving as a ground electrode;
   a cooling body surrounding said aluminium layer in thermal contact therewith.

11. A high frequency device according to claim 10, wherein: said cooling body is formed of two half shells, each half shell being provided with cooling fins.

* * * * *